United States Patent [19]

Watanabe

[11] Patent Number: 4,651,224

[45] Date of Patent: Mar. 17, 1987

[54] IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 713,191

[22] Filed: Mar. 18, 1985

[30] Foreign Application Priority Data

Mar. 22, 1984 [JP] Japan ................................ 59-55034

[51] Int. Cl.⁴ ................................................ H04N 1/00

[52] U.S. Cl. ........................................ 358/285; 358/75

[58] Field of Search .................. 358/285, 293, 294, 75

[56] References Cited

U.S. PATENT DOCUMENTS 4,326,222 4/1982 Connin et al. .................. 358/285 X

FOREIGN PATENT DOCUMENTS 83965 5/1982 Japan .................................. 358/285
154967 9/1982 Japan .................................. 358/285
134575 8/1983 Japan .................................. 358/285
117370 7/1984 Japan .................................. 358/285

*Primary Examiner*—Margaret A. Focarino
*Attorney, Agent, or Firm*—Cushman, Darby & Cushman

[57] ABSTRACT

An image forming apparatus which forms an image by transferring a color agent to a sheet, is provided with guide plates for guiding the sheet so that the sheet can travel in either direction in an image forming unit in an image forming mode, and with a first tray for receiving the copied sheet. A lever is provided for the guide plate so as to selectively discharge the sheet therefrom. The sheet discharged by the lever is received by a second tray.

11 Claims, 15 Drawing Figures

IMAGE FORMING APPARATUS

BACKGROUND OF THE INVENTION

The present invention relates to an image forming apparatus for forming an image on a sheet by transferring a color agent of the transfer member to the sheet in accordance with a latent image.

Among conventional image forming apparatuses of this type, are included thermal printers which print by heating a ribbon (transfer member) impregnated with a color agent. Generally, small-sized, low-priced, noise-free, and capable of printing on ordinary paper, these printing machines have recently been used in computers, recorders for the output of word processors, and copying apparatuses.

Generally, in an image forming apparatus of this type, in order to form a color image, a sheet is reciprocated with respect to a head upon forward and reverse rotations of the platen, thereby transferring images having different colors, in several steps. Thereafter, the sheet is discharged onto a discharge tray. In this case, the sheets, each having a multicolor image, are discharged onto a single tray and are sequentially stacked. When two sets of copies are formed with respect to a single original, they are stacked in the same manner as described above. However, when the first three pages of an original are copied as one set and the remaining pages are copied as another set, the copied sheets must be manually sorted, which is a cumbersome operation.

SUMMARY OF THE INVENTION

It is an object of the present invention to provide an image forming apparatus which can selectively sort sheets when they are discharged onto a tray.

According to an aspect of the present invention, there is provided an image forming apparatus which forms an image by transferring a color agent to a sheet, is provided with guide plates for guiding the sheet so that the sheet can travel in either direction in a image forming unit in an image forming mode, and with a first tray for receiving the copied sheet. A lever is provided for the guide plate so as to selectively discharge the sheet therefrom. The sheet discharged by the lever is received by a second tray.

DETAILED DESCRIPTION OF THE PREFERRED EMBODIMENTS

The preferred embodiments of this invention will now be described in detail with reference to the drawings attached hereto.

Figure 1:
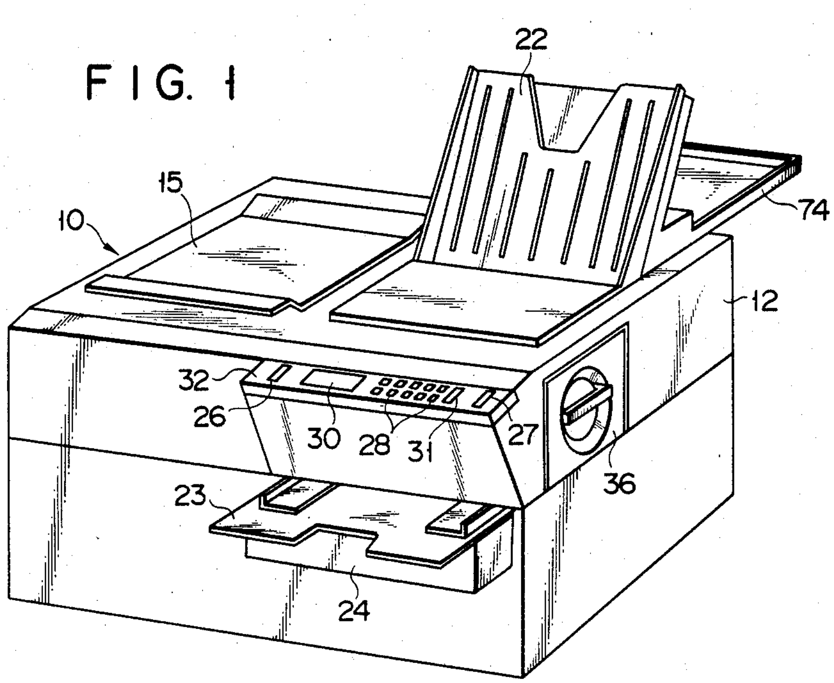
FIG. 1 is a perspective view of a thermal printer used for one embodiment of the present invention.
Figure 2:
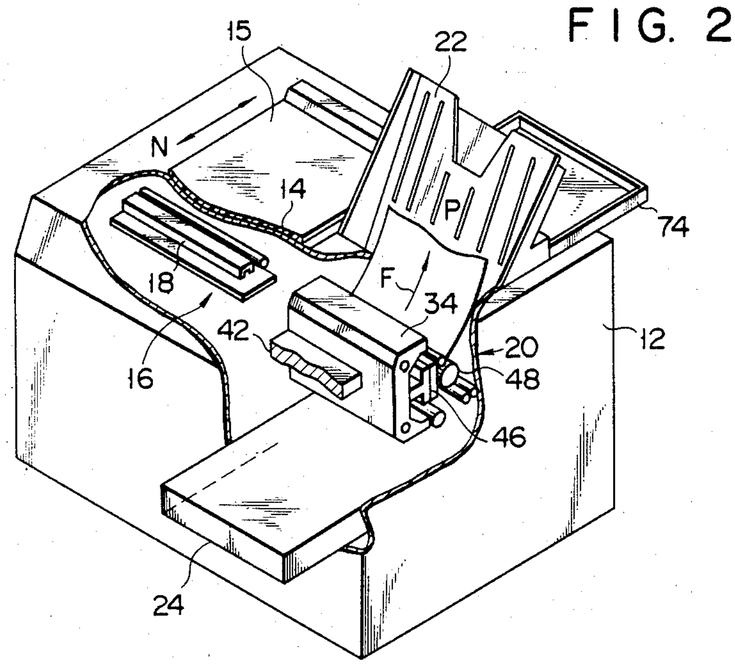
FIG. 2 is a broken away, perspective view schematically showing the printer of FIG. 1.

FIGS. 1 and 2 show a thermal printer as an image forming apparatus used for the present invention. As shown in these figures, the printer 10 comprises a housing 12 and an original table 14 provided in the upper side of the housing 12. An original to be copied may be placed on the table 14. The original table 14 is made of a transparent material such as glass and provided with a cover 15. A scanning unit 16 is provided within the housing 12, right below the table 14, to scan the original placed on the table 14. This unit 16 has an optical exposure system 18 which can move in the direction of arrow N to scan the original and to receive the light reflected from the original. The light the system 18 has received (i.e., optical information) is converted into electric signals. An image forming unit 20 is provided in the central portion of the housing 12. As will be described later, this unit is designed to form an image on a sheet of paper in accordance with the electric signals supplied from the scanning unit 16.

A tray unit 22 (described later) is secured to the top of the housing 12. It receives copied sheets of paper. A sheet cassette 24 is removably attached to the front of the housing 12. The cassette 24 contains sheets of paper, which may be fed into the apparatus one by one. A control panel 32 is provided on the front of the housing 12, right above the cassette 24. The panel 32 includes a start button 26, a two-set copy button 27, a keyboard with the keys 28, a display 30 for displaying warnings, e.g., "paper jamming," to the operator, and a button 31. When the button 26 is pushed, the apparatus starts. When the button 31 is pushed, a ribbon cassette will be ejected.

A door 36 attached to the right side of the housing 12 and usually covering an opening made in this side of the housing 12. It is opened so that a ribbon cassette 34 may be inserted into the housing or taken therefrom, through the opening. The door 36 has a lock mechanism (not shown) which locks the door 36 in accordance with signals input by pushing some of the keys 28 in a specific order.

The image forming unit 20 will be described in detail with reference to FIG. 3. The image forming unit 20 is provided with a holder 42 for holding the cassette 34 in place when the cassette 34 is inserted into the housing 12, and a thermal head 46 for heating the exposed portion of the ribbon 44, thereby to transfer inks from the ribbon to a sheet P of paper. The head 46 comprises a number of heating elements which are selectively driven by the electric signals supplied from the exposure system 18 to heat the ribbon and transfer inks therefrom to the sheet P. The unit 20 further comprises a platen 48 which faces the head 46 with the ribbon 44 between them. The platen 48 can be moved to push the sheet P and the ribbon 44 onto the thermal head 46. A heat radiating board 50 is arranged at the back of the thermal head 46 to radiate heat from the head 46.

A roller 52 is placed in front of the sheet cassette 24. When it is rotated by a drive means (not shown), a sheet P is fed out of the cassette 24. Arranged close to the roller 52 are a pair of guide plates 54 for guiding the sheet P from the roller 52 and a pair of aligning rollers 56 for aligning the front edge of the sheet P guided by the plates 54. Two backup rollers 58 on either side of the platen 48, which pinch it, cooperate to wind the sheet P (fed from the rollers 56) around the platen 48 and to keep the sheet P in contact with the platen 48.

The tray unit 22, which adjoins the image forming unit 20, comprises a plate or first tray 60, a first guide plate 62 and a second guide plate 64. These plates 60, 62 and 64 are integrally formed. The first tray 60 is used to receive the copied sheets. The guide plates 62 and 64 are used to guide the sheets in such a manner that the sheets are temporarily held during the image forming process.

A sheet exit hole 66 is formed in the central portion of the first plate 62 along a direction perpendicular to the convey direction of the sheet P. A sheet guide lever 68 is pivotally fitted in the hole 66. The guide lever 68 extends substantially parallel to the first guide plate 62, and is pivotally supported at either a first position (indicated by the solid line in FIG. 3) for guiding the sheet along the first plate 62 or a second position (indicated by the broken line in FIG. 3) at which the free end of the guide lever 68 abuts against the second guide plate 64. The guide lever 68 is coupled to a drive mechanism 70 for automatically driving it. The drive mechanism 70 is coupled to the control panel 32 described above and pivots the guide lever 68 to the first or second position by operation of the control panel 32.

Meanwhile, in the housing 12, a pair of exit rollers 72 and a second tray 74 for receiving the sheets discharged through the exit rollers 72 are adjacent to the exit hole 66 of the tray unit 22. A pair of exit rollers 76 are arranged at the inner end of the first tray 60 so as to move each copied sheet from the image forming unit 20 onto the first tray 60. The rollers 76 are attached to the tray unit 22 so that they may be removed from the housing 12 when the tray unit 22 is pulled out of the housing 12.

A first distribution guide 78 is hinged between the aligning rollers 56 and the platen 48 so that it can change the course of the sheets during the image forming operation, thereby to selectively guide those sheets being moved from the aligning rollers 56 toward the platen 48 onto the first guide plate 62. A second distribution guide 80 is hinged between the exit rollers 76 and the platen 48 to selectively guide those sheets being moved onto the second guide plate 64.

A sub guide 82 is coupled to the second guide 80 so as to guide the sheets therewith. The guide 82 is provided opposite to the second guide 80 and is set at a position indicated by the solid line in FIG. 3 when the sheets P are guided toward the second guide plate 64. On the other hand, when the sheets P are guided from the platen 48 to the exit rollers 76, the guide 82 is set at the position for forming the convey path with the second guide 80. Note that a guide plate 85 is provided between the sub guide 82 and the backup roller 58, and a recess for storing the free end of the second guide 80 is formed in the guide plate 85 so that the guide 80 does not contact the guide plate 85 when it is lifted up.

Figure 3:
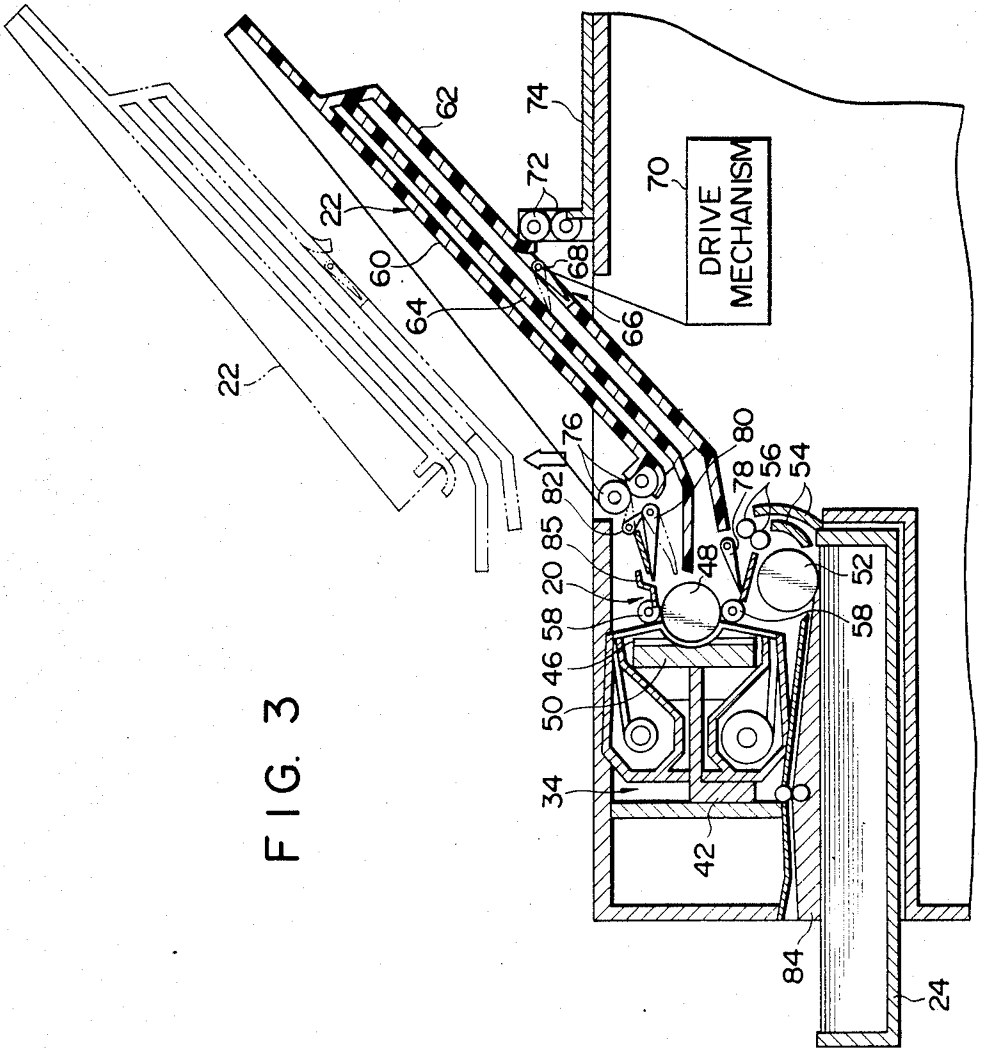
FIG. 3 is a vertical sectional view schematically showing the printer of FIG. 1.

As shown in FIG. 3, a sheet-bypass guide 84 is provided to guide sheets when the operator manually feeds them one by one into the apparatus.

Figure 4:
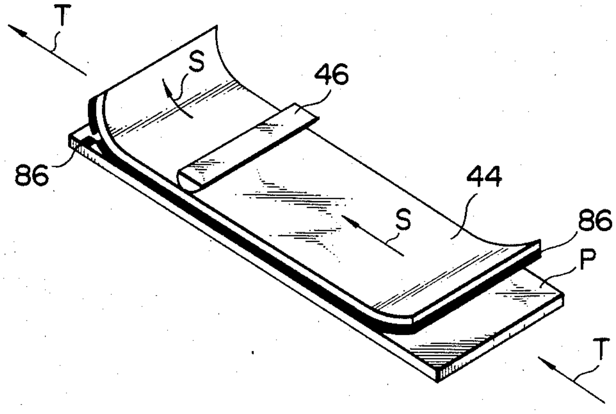
FIG. 4 is a perspective view for illustrating the transferring operation of the printer of FIG. 1.

The ink (color agent) 86 impregnated in the ribbon 44 is heated and melted by the thermal head 46 and thus is transferred to a sheet P as shown in FIG. 4. During this transfer of ink, the ribbon 44 and the sheet P are simultaneously moved in the directions of arrows S and T, respectively.

Figure 5:
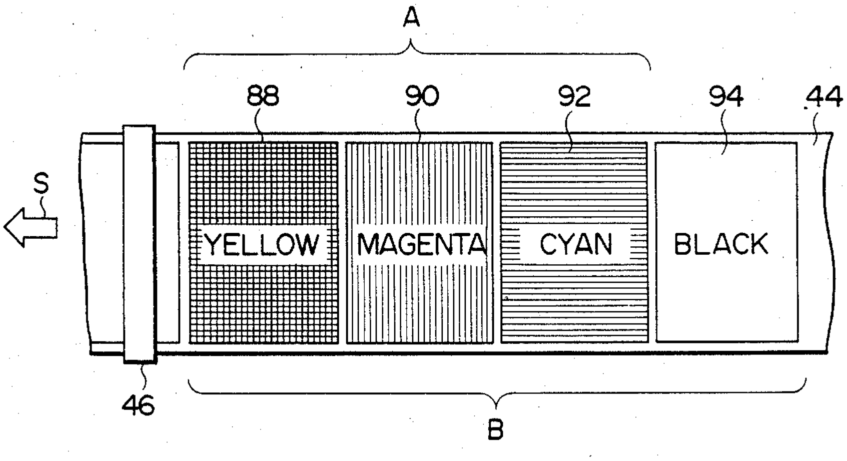
FIG. 5 is a plan view showing the way ink is applied to a ribbon used in the printer of FIG. 1.

As shown in FIG. 5, the ribbon 44 consists of a plurality of unit lengths A. Each unit length A consists of a yellow-ink region 88, a magenta-ink region 90 and a cyan-ink region 92. Alternatively, the ribbon 44 may consist of unit lengths B each consisting of these ink regions 88, 90 and 92 and a black-ink region 94. The ink is first transferred from one of the ink regions to the sheet P. Then, the sheet P is returned to its original position, and the ink is transferred from another ink region to the same portion of the sheet P. This process is repeated, thus transferring other inks to the sheet P. As a result, the different colored inks are superposed, thereby providing a multi-color print. In general, an image is printed in black on the sheet P when yellow ink, magenta ink and cyan ink are transferred to the same portion of the sheet P. A deeper black image may be obtained by transferring the ink from the black-ink region 94 to the sheet P.

The operation of the image forming unit 20 will now be described with reference to FIGS. 6 to 10.

Figure 6:
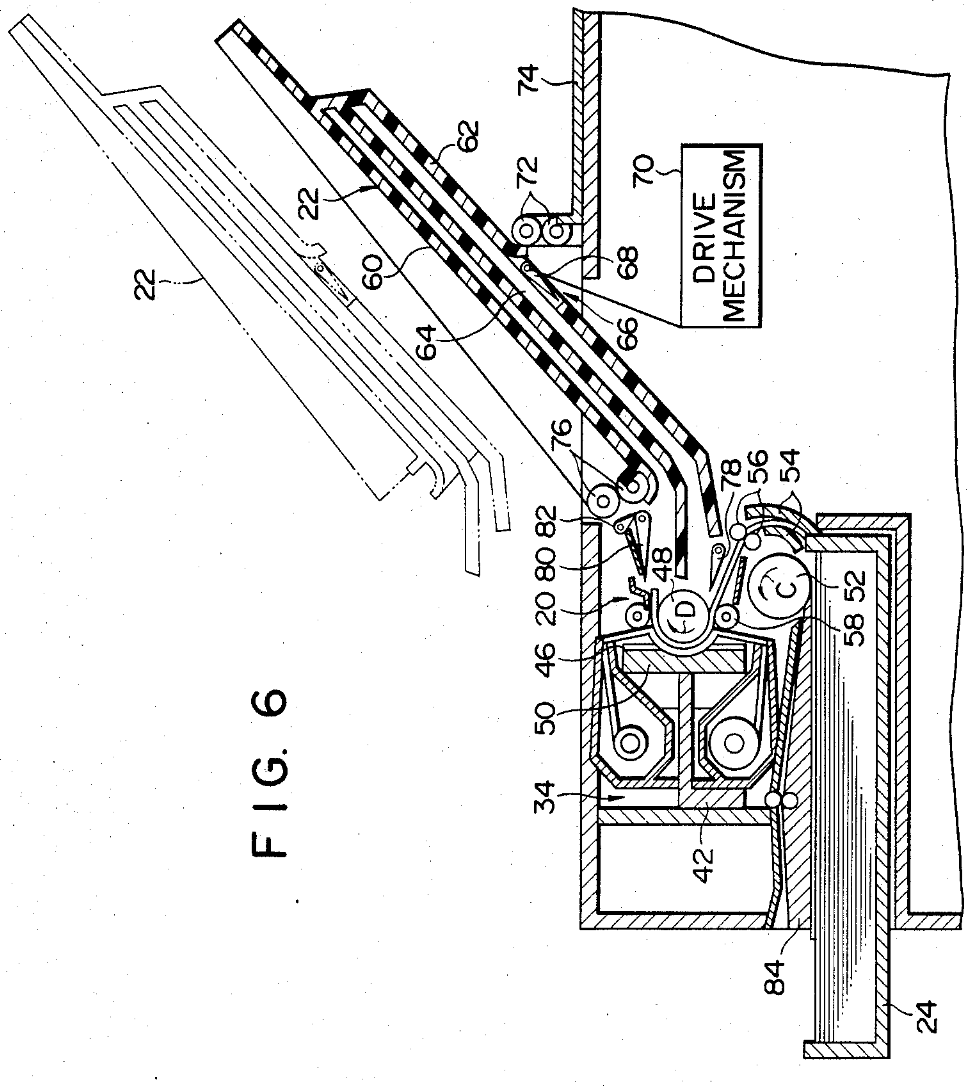
FIGS. 6 to 10 are sectional vlews for illustrating the operation of the printer of FIG. 1.

When the roller 52 rotates in the direction of arrow C as shown in FIG. 6, a sheet P is taken from the cassette 24. The guide plate 54 guides the sheet P to the aligning rollers 56. The rollers 56 align the sheet P so that the front edge thereof is positioned parallel to the platen 48. The sheet P is conveyed to the platen 48. Since the platen 48 is rotated in the direction of arrow D, the sheet P moves until it comes to face the thermal head 46 across the ribbon 44. Then, the head 46 heats part of the ribbon 44 in accordance with the signals from the exposure system 18, thus transferring the first color ink from the ribbon 44 to the sheet P.

Figure 7:
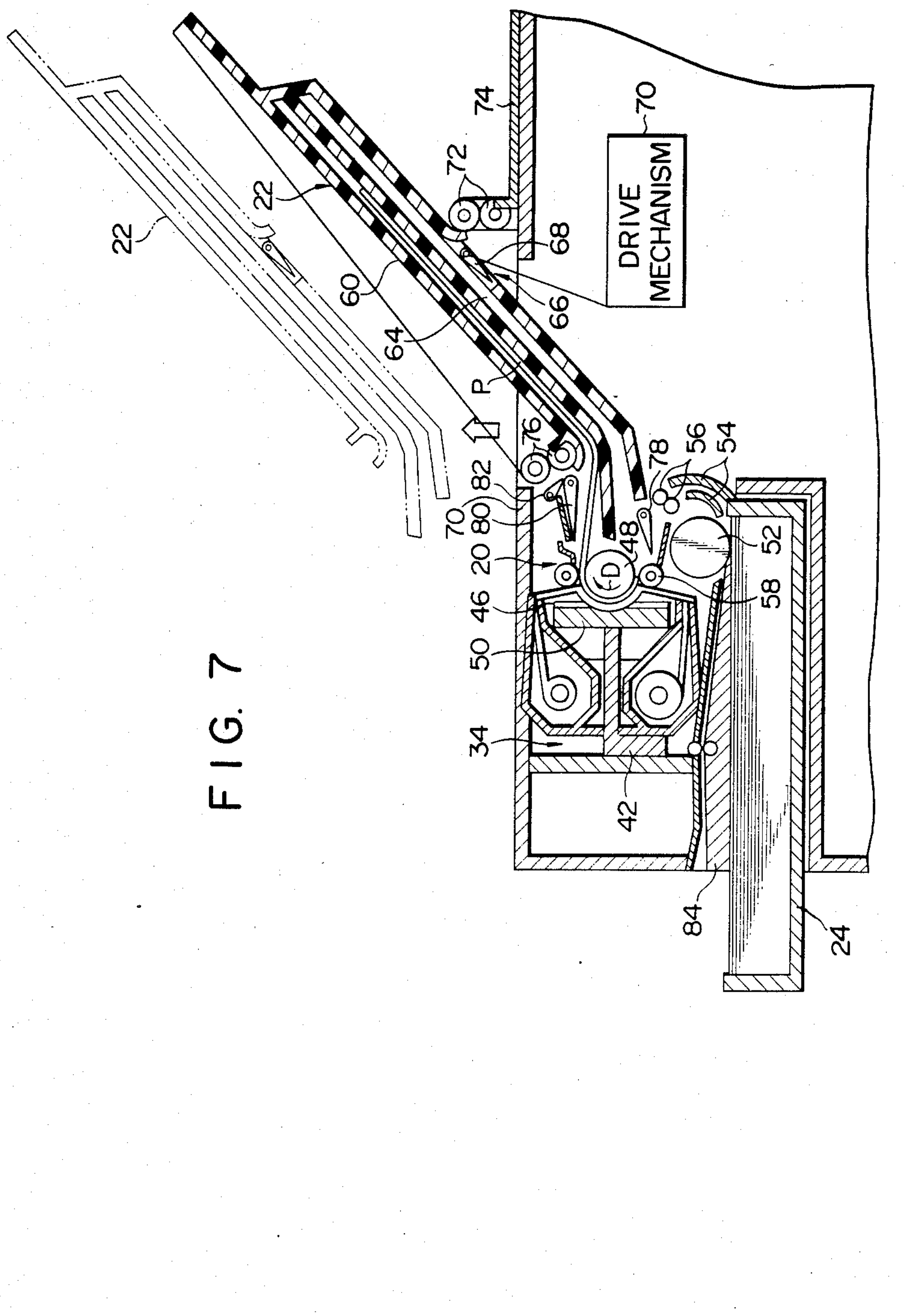

Then, as shown in FIG. 7, the second distribution guide 80 is lifted up. It guides the sheet P printed with the first color ink to the plate 64. The sheet P is then temporarily held on the plate 64. Thereafter, the first distribution guide 78 rocks counterclockwise. It is down when the sheet P is about to leave the guide 78.

Figure 8:
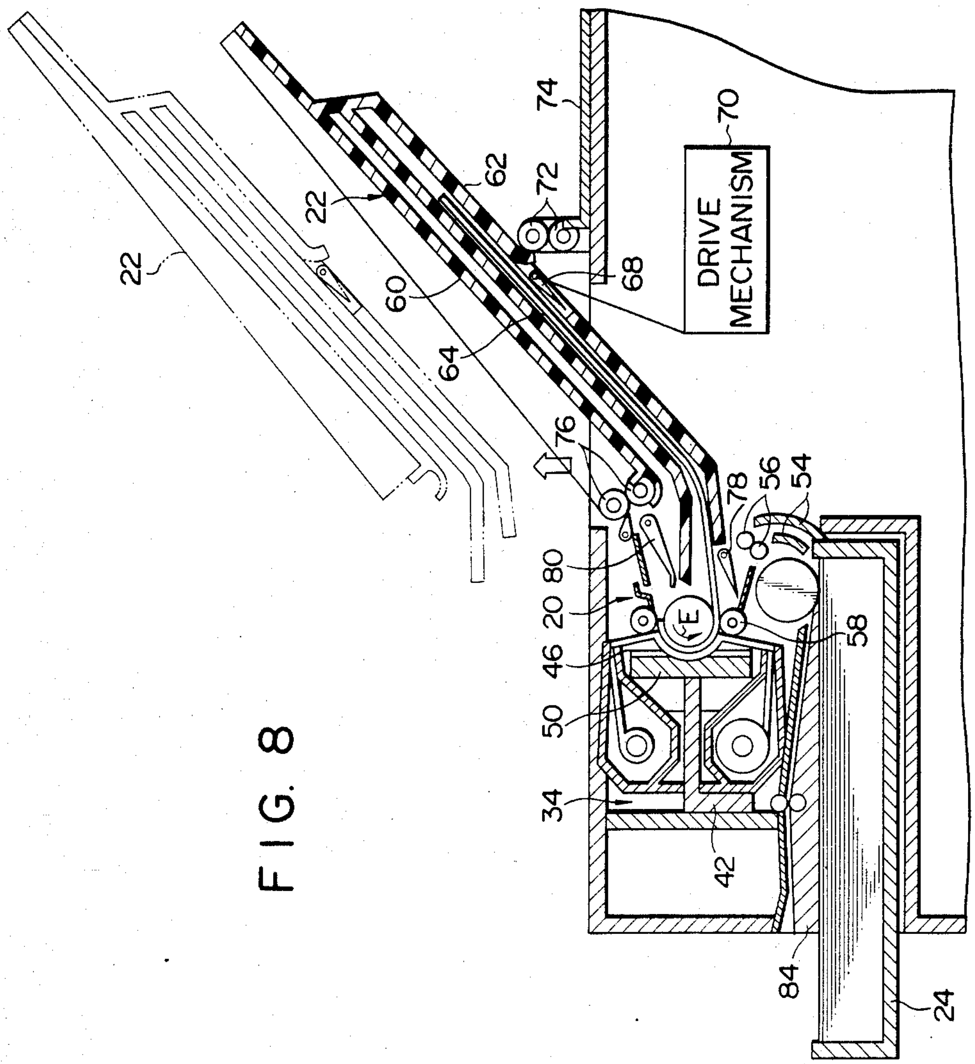

As shown in FIG. 8, the sheet P is further moved from the upper surface of the second guide plate 64 to the upper surface of the first guide plate 62. That is, it returns to the plate 62 and is transferred to the second color ink. The platen 48 is rotated counterclockwise, i.e., in the direction of arrow E, thus moving the sheet P along the first guide plate 62. Since the first distribution guide 78 is down at this time, the sheet P moves smoothly along the upper surface of the plate 62.

Figure 9:
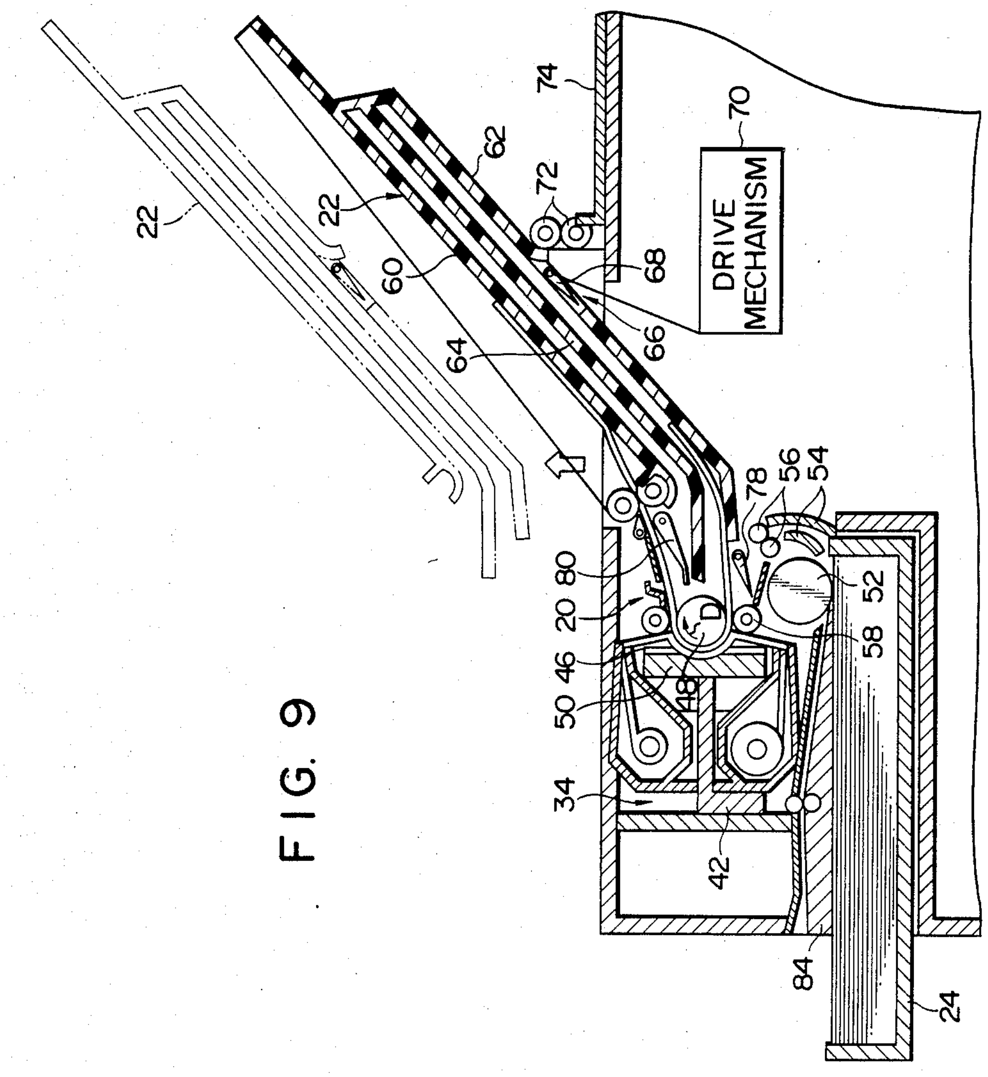

When the sheet P has been transferred to the upper surface of the first guide plate 62, the platen 48 is rotated in the direction of the arrow D as shown in FIG. 9, thus bringing the sheet P to the position where the sheet P faces the head 46. The third color ink is thereby transferred from the ribbon 44 to the sheet P. Thus transferring the three color inks to the sheet P and forming a multi-color image. The second distribution guide 80 is down, whereby the sheet P is discharged from the image forming unit 20 and put on the plate 60 of the tray unit 22 through the exit rollers 76.

Figure 11:
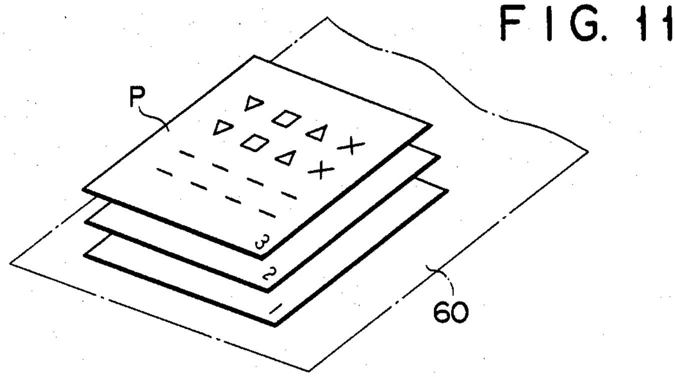
FIGS. 11 to 14 are respectively, views for explaining the stacking of sheets discharged onto respective trays.
Figure 13:
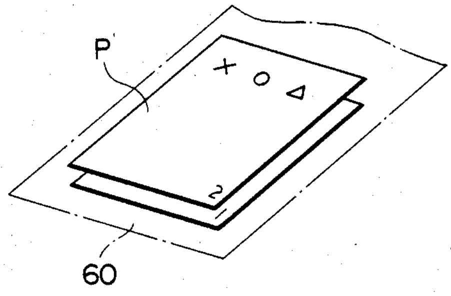

In this manner, the copied sheets are sequentially stacked on the first plate 60, as shown in FIGS. 11 and 13. In this case, each sheet is stacked on the upper surface (the surface on which an image is formed) of the preceding sheet.

Figure 10:
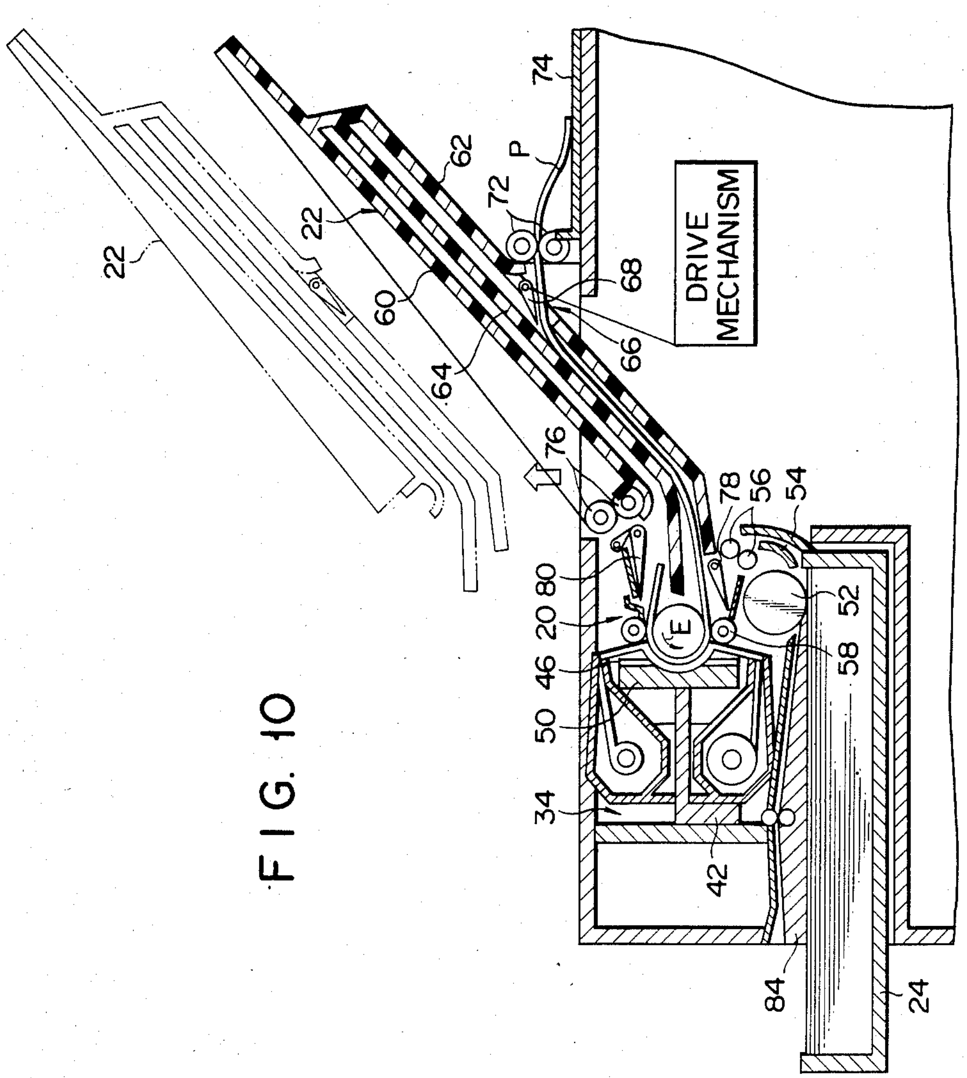
Figure 12:
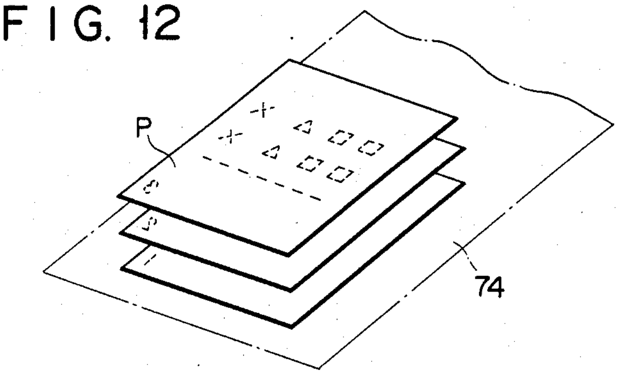
Figure 14:
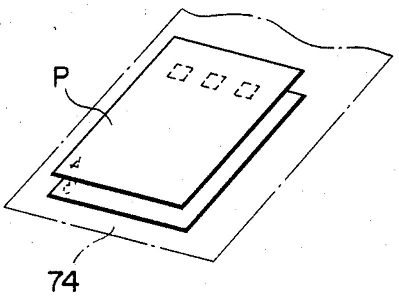

When two sets of copies are made from a single original (in this case, the two-set button 27 of the control panel 32 is depressed) or when a single set of orignals is divided into two sets and the latter half is copied, the state shown in FIG. 7 shifts to that shown in FIG. 10. The guide lever 68 is lifted up so that the free end thereof abuts against the second plate 64. Therefore, the platen 48 is rotated in the direction indicated by arrow E, and the sheet P guided along the first plate 62 is discharged therefrom through the hole 66. Furthermore, the sheet P is discharged on the second tray 74 through the first exit rollers 72 and stacked. In this case, as shown in FIGS. 12 and 14, each sheet is stacked on the back surface (i.e., the surface on which no image is formed) of the preceding sheet. Note that in the case of the two-set copy mode, the guide lever 68 is pivoted so that the sheets P are alternately discharged onto the first and second trays.

Figure 15:
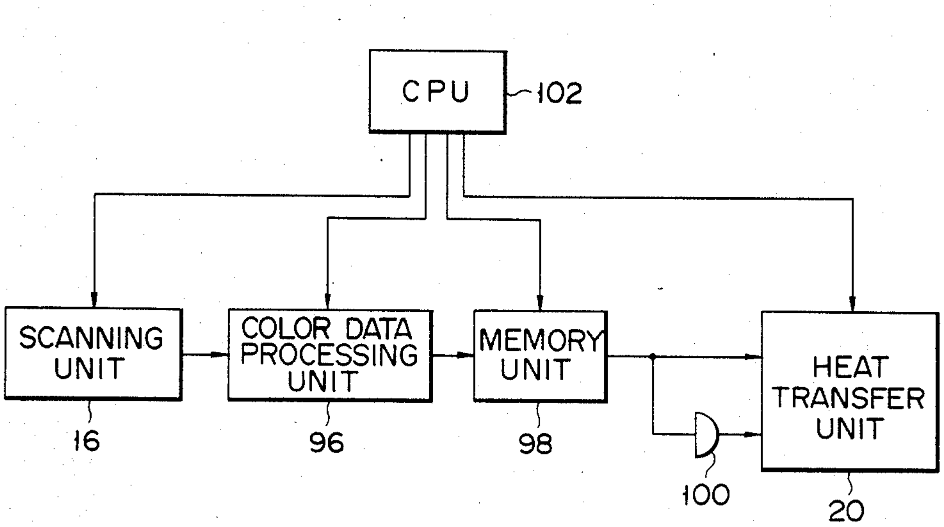
FIG. 15 is a block diagram showing the arrangement of the main part of the thermal printer shown in FIG. 1.

The apparatus is further provided with a control system. As shown in FIG. 15, this system comprises a color data processing unit 96 and a memory unit 98. The memory unit 98 is connected between the scanning unit 16 and the image forming unit 20. The color data processing unit 96 is coupled to the unit 16. The scanning unit 16 generates data representing the positions of the components of the original multi-color image, as well as the signals showing the colors of these image components, i.e., green, yellow, cyan and black color signals. The color data processing unit 96 receives the position data and the color signals from the unit 16, and converts the green, yellow, cyan and black color signals into signals designating yellow ink, magenta ink, cyan ink and black ink. The position data and the color signals are stored in the memory unit 98. To print the multi-color image on a sheet P, the position data and the color signals are read from the unit 98 and supplied to the image forming unit 20. The unit 20 transfers the respective inks from the ribbon 44 to the sheet P in accordance with the color signals and the position data. As a result, the multi-color image is printed. An AND gate 100 is connected between the units 16 and 20. The gate 100 generates a black color signal when it receives the magenta-ink, yellow-ink and cyan-ink signals.

The scanning unit 16, the heat image forming unit 20, the color data processing unit 96 and the memory unit 98 are connected to a CPU (central processing unit) 102. The CPU 102 controls the signal-generating timings of the units 16, 20, 96 and 102. It also controls the operations of these units.

The present invention is not limited to the embodiment described above, and various changes and modifications may be made within the scope and spirit of the invention.

For example, in the image forming process of the above embodiment, in order to temporarily store the sheet P, the tray unit 22 is provided with two guide plates, i.e., the first and second guide plates 62 and 64. However, the tray unit 22 can be provided with a single guide plate, i.e., the first guide plate 62. In this case, during the image forming process, the sheet P is guided along the first tray (guide plate) 60 and the first guide plate 62.

In the above embodiment, the tray unit 22 is detachable from the housing 12. However, it can be fixed thereto.

In the above embodiment, the first and second trays are used. However, the copied sheets can be discharged only onto the second tray. In this case, the sheets are stacked in the order of pages such that the first page faces upward (see FIG. 12 or 14).

When three or more sets of copies are made from a single original, a sorter can be arranged to be adjacent to the first exit rollers 72.

The guide lever need not be coupled to the drive mechanism; it can be manually operated by the operator.

In the above embodiment, every time the sheet moves in one direction, ink is transferred thereto, but ink can also be transferred when the sheet moves in either direction, backwards or forwards.

In the above embodiment, ink is transferred from the ribbon to the sheet, but ink can be injected from ink injector to the sheet.

What is claimed is:

1. An image forming apparatus which forms an image by transferring a color agent to a sheet in an image forming unit, comprising:

guide means for guiding movement of a sheet;

first means, coupled to said guide means, for receiving a sheet from said guide means on which an image has been formed;

discharging means, coupled to said guide means, for selectively removing the sheet from said guide means; and second means for receiving the sheet removed by said discharging means.

2. An apparatus according to claim 1, wherein said guide means extends substantially parallel to said first means, and said guide means and said first means are integrally formed as a tray unit.

3. An apparatus according to claim 2, wherein said tray unit is separately formed from the image forming unit, and is detachable therefrom.

4. An apparatus according to claim 2, wherein said guide means comprises first and second guide plates extending is parallel to each other.

5. An apparatus according to claim 1, wherein said discharging means comprises a pivotal level which is set at one of a first position for guiding the sheet along said guide means and, a second position for discharging the sheet from said guide means.

6. An apparatus according to claim 1, wherein said second means comprises rollers for conveying the sheet discharged by a lever to said second tray.

7. An apparatus according to claim 1, wherein said image forming unit is provided with a distributing guide for distributing the sheet to one of said guide means and said first means.

8. An apparatus according to claim 1, wherein said discharging means comprises a drive mechanism for driving said discharging means so that the sheets are alternately discharged therefrom and one set of a copy is discharged onto each of said first and second trays.

9. An apparatus according to claim 5, wherein said discharging means comprises drive means for driving said discharging means so that the sheets are alternately discharged therefrom and one set of a copy is discharged onto each of said first and second means.

10. An apparatus for processing paper sheets which have been processed by an image forming unit, comprising:

guide means, coupled to said image forming unit, for receiving paper sheets therefrom and guiding said received paper sheets along a length thereof;

means for driving said sheet along said guide means;

first means for receiving sheets guided along said guide means, said sheets being received with a first surface thereof being upwardly facing;

second means for receiving sheets guided along said guide means, said sheets being received with a second surface thereof, different from said first surface, being upwardly facing; and means for selectively guiding paper sheets on said guide means to one of said first and second means.

11. Apparatus as in claim 10 further comprising an image forming unit.

* * * * *